United States Patent
Devlin et al.

(10) Patent No.: US 11,741,331 B1
(45) Date of Patent: Aug. 29, 2023

(54) ELECTRONIC TAG WITH TWO SCANNING MODALITIES

(71) Applicant: the dtx company, New York, NY (US)

(72) Inventors: Patrik Andrew Devlin, New York, NY (US); Neil Wayne Cohen, Oakton, VA (US); Corey Benjamin Daugherty, Barrington, RI (US); Jack Armstrong, Greenwich, CT (US); Andrew Duplessie, New York, NY (US); Alex Rogers, Greenwich, CT (US)

(73) Assignee: the dtx company, New York, NY (US)

( * ) Notice: Subject to any disclaimer, the term of this patent is extended or adjusted under 35 U.S.C. 154(b) by 0 days.

(21) Appl. No.: 17/678,496

(22) Filed: Feb. 23, 2022

(51) Int. Cl.
*H04W 4/80* (2018.01)
*G06K 19/07* (2006.01)
*G06K 7/10* (2006.01)
*G06K 19/077* (2006.01)

(52) U.S. Cl.
CPC ..... *G06K 19/0723* (2013.01); *G06K 7/10366* (2013.01); *G06K 19/0776* (2013.01); *H04W 4/80* (2018.02)

(58) Field of Classification Search
CPC .................................................. G06K 19/0723
See application file for complete search history.

(56) References Cited

U.S. PATENT DOCUMENTS

| | | |
|---|---|---|
| 7,467,356 B2 | 12/2008 | Gettman et al. |
| 7,504,949 B1 * | 3/2009 | Rouaix ............. G06Q 10/06 340/572.1 |
| D697,529 S | 1/2014 | Judge Cornish |
| D702,723 S | 4/2014 | Abratowski et al. |
| D723,104 S | 2/2015 | Cho et al. |
| 9,201,975 B2 | 12/2015 | Hall |
| D769,296 S | 10/2016 | Grecia |
| 9,704,081 B2 | 7/2017 | Tanaka et al. |
| 9,936,249 B1 | 4/2018 | Nelson et al. |
| D826,955 S | 8/2018 | Grecia |
| D857,054 S | 8/2019 | Grecia |
| 10,375,060 B1 | 8/2019 | Graves et al. |
| D860,256 S | 9/2019 | Stephen |

(Continued)

OTHER PUBLICATIONS

Inderscience Enterprises Ltd., Wickramasinghe et al., "A Mathematical Model for Computational Aesthetics," pp. 310-324, 2010, Int. J. Computational Vision and Robotics, vol. 1, No. 3.

(Continued)

*Primary Examiner* — Joseph H Feild
*Assistant Examiner* — Pameshanand Mahase
(74) *Attorney, Agent, or Firm* — Weiss & Arons LLP

(57) ABSTRACT

This disclosure relates to an electronic tag that may be scanned using at least two modalities, such by scanning a radio-frequency identification ("RFID") embedded within the tag and/or scanning a machine-readable label ("MRL") visible from an outside of the tag. Systems may track and capture downstream user interaction with content presented in response to a scan. Systems may distinguish between scan of an MRL versus scans of an RFID chip. A scan of an MRL may trigger loading of a first scan destination on a scanning device. A scan of an RFID chip may trigger loading of a second scan destination on a scanning device. Systems may generate analytics on detected differences between whether an MRL or RFID chip is scanned.

16 Claims, 10 Drawing Sheets

(56) References Cited

U.S. PATENT DOCUMENTS

| | | | |
|---|---|---|---|
| 10,460,138 B2 | 10/2019 | Barnum | |
| 10,803,432 B1 | 10/2020 | Miles | |
| D905,743 S | 12/2020 | Jewitt | |
| 10,949,725 B1 | 3/2021 | Alvarez-Cohen et al. | |
| 10,963,868 B1 | 3/2021 | McCauley et al. | |
| D918,936 S | 5/2021 | Walsh et al. | |
| 11,010,650 B1 | 5/2021 | Devlin et al. | |
| 11,106,753 B1 | 8/2021 | Fowler et al. | |
| 11,120,095 B2 | 9/2021 | Askarian et al. | |
| D936,699 S | 11/2021 | McDonald | |
| 11,182,768 B2 | 11/2021 | Fowler et al. | |
| D939,570 S | 12/2021 | Dye et al. | |
| 11,194,981 B2 | 12/2021 | Filter et al. | |
| 11,205,105 B1 | 12/2021 | Devlin et al. | |
| 11,206,432 B1 | 12/2021 | Fowler et al. | |
| 11,263,282 B2 | 3/2022 | Fowler et al. | |
| 11,334,779 B1 | 5/2022 | Schwarzberg | |
| 11,347,823 B2 | 5/2022 | Askarian et al. | |
| 2002/0032791 A1 | 3/2002 | Isherwood et al. | |
| 2002/0139839 A1 | 10/2002 | Catan | |
| 2004/0123223 A1 | 6/2004 | Halford | |
| 2004/0246529 A1 | 12/2004 | Pruden et al. | |
| 2006/0196950 A1 | 9/2006 | Kiliccote | |
| 2006/0215931 A1 | 9/2006 | Shimomukai | |
| 2007/0035327 A1 | 2/2007 | Baeckler et al. | |
| 2007/0286455 A1 | 12/2007 | Bradley | |
| 2009/0094175 A1 | 4/2009 | Provos et al. | |
| 2009/0240816 A1 | 9/2009 | Philyaw et al. | |
| 2010/0128921 A1 | 5/2010 | Alattar et al. | |
| 2011/0290882 A1 | 12/2011 | Gu et al. | |
| 2012/0016678 A1 | 1/2012 | Gruber et al. | |
| 2012/0206648 A1 | 8/2012 | Casagrande et al. | |
| 2012/0256732 A1* | 10/2012 | McAllister | B65C 11/006 340/10.2 |
| 2012/0278465 A1 | 11/2012 | Johnson | |
| 2013/0112760 A1 | 5/2013 | Schory et al. | |
| 2013/0197992 A1 | 8/2013 | Bao | |
| 2013/0215475 A1 | 8/2013 | Noguchi | |
| 2013/0228624 A1 | 9/2013 | Byrd et al. | |
| 2013/0297430 A1 | 11/2013 | Soergel | |
| 2014/0001253 A1 | 1/2014 | Smith | |
| 2014/0095461 A1 | 4/2014 | Burt | |
| 2015/0006702 A1 | 1/2015 | Lakes et al. | |
| 2015/0014417 A1 | 1/2015 | Finlow-Bates et al. | |
| 2015/0048169 A1 | 2/2015 | Doberschutz | |
| 2015/0099946 A1* | 4/2015 | Sahin | A61B 7/04 600/301 |
| 2015/0262221 A1 | 9/2015 | Nakano et al. | |
| 2015/0324678 A1 | 11/2015 | Simske et al. | |
| 2016/0063129 A1 | 3/2016 | Lim et al. | |
| 2016/0148083 A1 | 5/2016 | Osborne et al. | |
| 2016/0162767 A1 | 6/2016 | Ito et al. | |
| 2016/0189016 A1 | 6/2016 | Windmueller et al. | |
| 2016/0247423 A1 | 8/2016 | Hohl et al. | |
| 2016/0364825 A1 | 12/2016 | Pan | |
| 2017/0264608 A1 | 9/2017 | Moore et al. | |
| 2017/0300854 A1* | 10/2017 | Harcar | G06K 19/06103 |
| 2018/0365330 A1 | 12/2018 | Lin et al. | |
| 2019/0089757 A1 | 3/2019 | Sorensen et al. | |
| 2019/0138721 A1 | 5/2019 | Wojnowicz et al. | |
| 2019/0221293 A1 | 7/2019 | Zhang | |
| 2019/0234975 A1* | 8/2019 | Pothini | G01N 35/00871 |
| 2019/0258814 A1 | 8/2019 | Heeter | |
| 2019/0281030 A1* | 9/2019 | Isaacson | H04L 63/0838 |
| 2019/0281124 A1 | 9/2019 | Lim et al. | |
| 2020/0356080 A1 | 11/2020 | Principato | |
| 2020/0356083 A1 | 11/2020 | Principato | |
| 2020/0356741 A1 | 11/2020 | Principato | |
| 2020/0394699 A1 | 12/2020 | Mueller | |
| 2021/0042730 A1* | 2/2021 | Lee | G07G 1/0045 |
| 2021/0056541 A1 | 2/2021 | Kim | |
| 2021/0217006 A1 | 7/2021 | Ragavan et al. | |
| 2021/0271803 A1 | 9/2021 | Seymour et al. | |
| 2021/0287202 A1 | 9/2021 | Fowler et al. | |
| 2021/0334490 A1 | 10/2021 | Luk et al. | |
| 2021/0357715 A1 | 11/2021 | Schimke et al. | |
| 2021/0377263 A1 | 12/2021 | Law | |
| 2022/0215190 A1 | 7/2022 | Cohen et al. | |
| 2022/0253811 A1 | 8/2022 | Fowler et al. | |
| 2022/0374664 A1 | 11/2022 | Zhou et al. | |

OTHER PUBLICATIONS

Elsevier, Maity et al., "A Computational Model to Predict Aesthetic Quality of Text Elements of GUI," pp. 152-159, 2016, Procedia Computer Science 84 (2016), www.sciencedirect.com.

AI Shack, Utkarsh Sinha, "Scanning QR Codes," 2010, https://aisback.in/tutorials/scanning-qr-codes-1/.

AIA Vision Online, "The Most Common Causes of Unreadable Barcodes," Apr. 15, 2015, https://www.visiononline.org/vision-resources-details.cfm?content_id=5404.

Workwithcolor.com, "Color Properties/Terminology," Retrieved on Jun. 8, 2020, http://www.workwithcolor.com/color-properties-definitions-0101.htm.

The Eurographics Association, Florian Hoenig, "Defining Computational Aesthetics," 2005, Computational Aesthetics in Graphics, Visualization and Imaging (2005), www.diglib.eg.org.

DataGenetics, "Wounded QR Codes," Nov. 2013, http://datagenetics.com/blog/november12013/index.html.

QR Code Monkey, "6 Reasons Why Your QR Code Is Not Working," Retrieved on Jun. 9, 2020, https://www.qrcode-monkey.com/6-reasons-why-your-qr-code-is-not-working.

TechSpot, Inc., Mark Turner, "QR Codes Explained," Sep. 3, 2018, https://www.techspot.com/guides/1676-qr-code-explained/.

Medium.com, Sciforce, "Computational Aesthetics: Shall We Let Computers Measure Beauty?," Jun. 12, 2020, https://medium.com/sciforce/computational-aesthetics-shall-we-let-computers-measure-beauty-db2205989fb.

Thonky.com, "Module Placement in Matrix," Retrieved on Jun. 8, 2020, https://www.thonky.com/qr-code-tutorial/module-placement-matrix.

Keyence Corporation of America, "What Is A QR Code," Retrieved on Jun. 8, 2020, https://www.keyence.com/ss/products/auto_id/barcode_lecture/basic_2d/gr/.

Wikimedia Foundation, Inc., "QR Code," Retrieved on Jun. 3, 2020, https://en.wikipedia.org/wiki/QR_code.

Wikimedia Foundation, Inc., Walter Tuveli, "QR Code-Structure," 2012, https://en.wikipedia.org/wiki/QR_code#/media/File:QRCode-2-Structure.png.

Wikimedia Foundation, Inc., "ShotCode," Retrieved on Aug. 6, 2021, https://en.wikipedia.org/wiki/ShotCode#searchInput.

Medium.com, Punit Pathak, "ETL-Understanding It and Effectively Using It," Jan. 7, 2019, https://medium.com/hashmapinc/etl-understanding-it-and-effectively-using-it-f827a5b3e54d.

Strathmore University (Nairobi, Kenya), Kizi Dimira Othuon, "Improving Customer Experience Using an Android Barcode Reader Application," Apr. 2018, https://su-plus.strathmore.edu/bitstream/handle/11071/5978/Improving%20customer/20shopping%20experience%20using%20an%20Android%20barcode%20reader%20application.pdf?sequence=1&isAllowed=y.

Westboroughtv.org, Horrigan, Aidan, "Mr. WHS 2020," Jun. 12, 2020, https://westboroughtv.org/mr-whs-2020-2/.

Facebook.com, Wa, Izakaya, "QR codes for the dinner menu and lunch menu at Memorial!" Jul. 24, 2020, https://m.facebook.com/196433773873837/posts/qr-codes-for-the-dinner-menu-and-lunch-menu-at-memorial.1730306280486571.

Ispot.tv, "StockX TV Spot, 'Flowcode: Never Sold Out,'" Mar. 27, 2020, https://www.ispot.tv/ad/nVly/stockx-flowcode-never-sold-out.

Nyp.org, "#FitForTheFrontline Challenge Unites Nation's Top Medical Centers to Support Frontline Healthcare Workers," May 28, 2020, https://www.nyp.org/news/fit-for-the-frontline-challenge.

* cited by examiner

ELECTRONIC TAG WITH TWO SCANNING MODALITIES

FIELD OF TECHNOLOGY

This disclosure relates to an electronic tag that may be scanned using at least two modalities, such as by scanning a radio-frequency identification ("RFID") embedded within the tag and/or scanning a machine-readable label ("MRL") visible from an outside of the tag.

BACKGROUND

MRLs, such as quick-response ("QR") codes, provide businesses with a fast and efficient medium for connecting with consumers. Machine readable instructions, such as URLs, contact information and other alphanumeric information may be encoded in an MRL. Businesses may utilize an MRL to guide consumers to a desired destination (real or virtual) where the customers can access products, services and information provided by the business. However, a scanning device is needed to scan and interpret the instructions encoded in an MRL.

In 2010, 62.6 million people in the United States used smartphones. In the 2020's that number is predicted to more than quadruple to 272.6 million. Commensurate with increased smartphone use is integration of technology into smartphones that scans and interprets an MRL. Today, many smartphones include a native camera application that recognizes MRLs such as QR codes. There is no need to download and install a separate application or use a separate reader to scan an MRL.

MRLs potentially offer an inexpensive means of providing consumers with easy access to products, services or information. Consumers are already using their smartphones to search for information about a product/service of interest. Now, businesses can tap into this tendency by using MRLs to guide consumers to targeted content associated with a product/service. Furthermore, MRLs are inexpensive and easy to print on a variety of surfaces such as business cards, product packaging, posters or marketing materials.

Despite the proliferation of mobile devices, widespread adoption of MRLs still faces significant hurdles. An exemplary hurdle facing widespread adoption of MRLs is that conventionally, instructions encoded in a MRL may be static and not easily changed. MRLs may be printed and affixed to real property or other tangible surfaces. For example, a MRL may be positioned at a fixed location or on a specific object (e.g., a bicycle, hat, shirt, car). Contact information or a URL associated with a business may change. Yet, the MRL affixed to a tangible surface may still encode old contact information or an old URL. It is costly to remove an old MRL and replace it with an updated MRL.

Additionally, an MRL typically requires an unobstructed line of sight view between the MRL and a scanning device. Therefore, successful scanning of an MRL may be dependent on weather and ambient lighting conditions. Because MRLs require a direct line of sight view to be scannable, they are typically exposed to environmental conditions that may damage the MRL. Additionally, scanning an MRL may require manual action. For example, a user may need to activate and focus a camera on smartphone to successfully scan an MRL.

On the other hand, Radio Frequency IDentification ("RFID") chips may overcome some of the drawbacks associated with MRLs. An RFID chip may include circuitry electronically programmed to store information. The stored information may be captured by a scanning device outside a line-of-sight with the RFID chip. RFID chips are also less likely to be damaged because they are typically enclosed within a protective housing.

However, RFID chips also have disadvantages. For example, RFID chips are typically associated with low-speed connection and require close proximity of a scanning device and an RFID chip to scan the RFID chip. RFID chips also require power to transmit stored information.

It would be desirable to provide apparatus and methods that solve the technical challenges of using MRLs and RFID chips. It would be desirable to increase the efficacy and usability of MRLs and RFID chips. It would further be desirable to increase the effective data storage limits associated with MRLs and RFID chips by providing apparatus and methods that utilize both MRLs and RFID chips to expand the amount of data captured when interacting with MRLs and RFID chips. Accordingly, it is desirable to provide apparatus and methods for an ELECTRONIC TAG WITH TWO SCANNING MODALITIES.

BRIEF DESCRIPTION OF THE DRAWINGS

The objects and advantages of this disclosure will be apparent upon consideration of the following disclosure, taken in conjunction with the accompanying drawings, in which like reference characters refer to like parts throughout, and in which.

DETAILED DESCRIPTION

Figure 1:
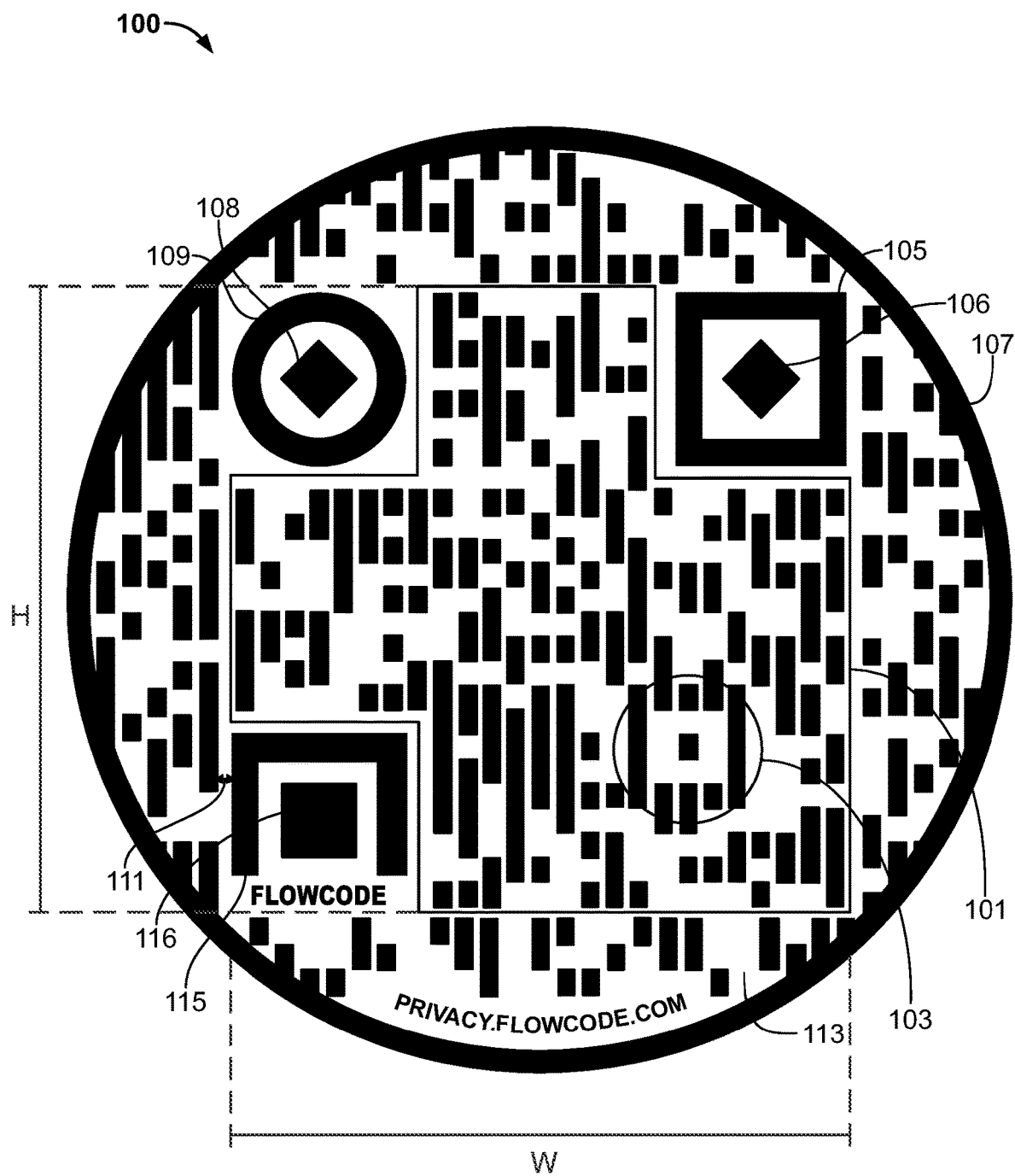
FIG. 1 shows an illustrative machine-readable label in accordance with principles of the disclosure.

Apparatus and method for an electronic tag having at least two scanning modalities is provided. A first scanning modality may include a radio-frequency identification ("RFID") chip. The RFID chip may be embedded within the tag. A second scanning modality may include a machine-readable label ("MRL"). The MRL may be affixed to the tag and visible from an outside of the tag.

Capturing information encoded in a MRL or RFID chip may be referred to herein as a "scan" of the MRL or RFID chip. A device that captures information encoded in the MRL or RFID chip may be referred to herein as a "scanning device."

An RFID chip may include an integrated circuit, storage memory and an antenna. These electronic components of an RFID chip are used to transmit data to a scanning device that scans the RFID chip. An RFID chip may include a housing that holds the electronic components together and shields them from environmental conditions. The housing may include any suitable material. For example, the housing may be constructed from plastic. The electronic components of the RFID chip may be embedded between layers of the plastic housing.

RFID chips may be passive chips or active chips. Passive chips are typically smaller in size and less expensive to manufacture. Passive chips cannot transmit data unless they receive power from a scanning device. Unlike passive tags, active RFID chips have an onboard power supply (e.g., a battery). Active RFID chips are capable of initiating data transmission without receiving power from a scanning device.

Generally, RFID chips range in size from just a centimeter or two to a few inches. RFID chips with larger storage memory and larger antennas (for longer transmission range) are bigger in physical size. A scanning device may supply power to a passive RFID chip and communicate with the otherwise unpowered and passive RFID chip using radio waves. The scanning device may generate an electromagnetic field that powers the passive RFID chip. Because passive RFID chips do not require their own power supply, they may have a wide variety of form factors such as stickers, key fobs, or cards.

Passive near-field-communication ("NFC") chips are a subset of RFID chips. Passive NFC chips communicate by establishing inductive coupling between an antenna of the NFC chip and the antenna of a scanning device. NFC chips may communicate using RFID protocols published by the International Organization for Standardization ("ISO") of Geneva, Switzerland such as ISO/IEC 14443, which is hereby incorporated herein by reference in its entirety. NFC chips typically communicate at a frequency of 13.56 MHz at data rates ranging from 106 to 424 kbit/s.

Operation of an NFC chip may be defined by one or more standards published by the International Organization for Standardization ("ISO") of Geneva, Switzerland. Illustrative standards published by the ISO regarding NFC chips include ISO/IEC 18092, ISO/IEC 21481 and ISO/IEC 18000-3, which are hereby incorporated herein by reference in their entireties. A scanning device and a passive NFC chip must be "near" each other to successfully communicate. Typically, the scanning device and passive NFC chip require a separation of 10 centimeters ("cm") or less to communicate. A connection between a scanning device and passive NFC chip is typically automatically established in less than 0.1 second.

There are four types of NFC chips. Each of the different NFC types have different data capacities and data transfer speeds. For example, type 1 NFC chips typically store 96 bytes of data and transfer data at a rate of 106 Kbps (kilobits per second). Type 4 NFC chips can store up to 32 kilobytes of data and transfer data at a rate of 424 Kbps. Type 1 and Type 2 NFC chips can be written to multiple times. Type 1 and Type 2 NFC chips can also be permanently locked, or encrypted, so that the stored data cannot be manipulated. Type 3 and Type 4 NFC chips can only be written to once and cannot be re or overwritten. Type 3 and Type 4 NFC chips also lack the encryption and security features of NFC type 1 and 2 chips.

NFC communication protocols may support three modes of communication: peer-to-peer, read/write mode, and card emulation. The NFC card emulation mode enables scanning devices to perform transactions such as payment or ticketing. The NFC reader/writer mode enables scanning devices to read information stored on NFC chips. The NFC peer-to-peer mode enables two scanning devices to communicate with each other and exchange information in an ad hoc fashion. One of the devices in an NFC peer-to-peer mode communication may be a passive NFC chip.

An active NFC chip may be brought within close proximity to a passive NFC chip. "Close proximity" may be defined as within 20 centimeters. Some passive NFC chips may require contact to transfer or receive information. When in close proximity, the active NFC chip generates an electromagnetic field that causes small currents to flow within the passive NFC chip. The power generated by the active NFC chip allows the passive NFC chip to send data as long as the active NFC chip maintains the electromagnetic field. Close proximity between active and passive NFC chips allows the passive NFC chip to receive a stronger electromagnetic field.

The capture of information encoded on an NFC chip may be referred to herein as a scan of the NFC chip. A device that captures the information encoded on a RFID chip may be referred to herein as a scanning device. For example, a scanning device may include an active NFC chip.

Apparatus for an electronic tag is provided. The tag may include a housing. The housing may have any suitable dimensions. For example, the housing may have any suitable shape such as a circular, rectangular or triangular shape. The housing may be flexible. The housing may be rigid. The housing may be constructed from any suitable material or combination of multiple materials. Illustrative materials that may be used to construct the housing include metal, plastic, ceramic, fabric and paper.

The tag may include a radio-frequency identification ("RFID") chip embedded within the housing. The RFID chip may be a passive RFID chip. The RFID chip may be an active RFID chip. The RFID chip may be an NFC chip. The RFID chip may encode a first scan destination. In other embodiments, the RFID tag may be capable of communication using Bluetooth, 5G, wired or other wireless communication protocols.

A scan destination may include information that triggers any suitable function on a scanning device. For example, an illustrative scan destination may include information that triggers a presentation of a target landing page on the scanning device. An illustrative landing page may be a webpage or other content. For example, information in a scan destination may trigger launching of a web browser resident on the scanning device and loading of the target landing page.

Other illustrative functions triggered by a scan destination may include initiating a phone call or a video conference, launching an email/text application on the scanning device and formulating a pre-formatted message to a target destination. A function triggered by a scan destination may be based on one or more scan event details captured in connection with a scan.

The tag may include a machine-readable label ("MRL"). An MRL may include Quick Response ("QR") codes, Aztec codes, ShotCodes, SPARQCodes and any other suitable two-dimensional matrix barcodes. An MRL may include one-dimensional (e.g., linear) or three-dimensional machine-readable codes. Machine readable information may be encoded in an MRL. The information may include a uniform resource locator ("URL"), contact information or any other information.

Information encoded in an MRL may be captured optically, using a camera of a mobile device or using any suitable technology or protocol for capturing information encoded in an MRL. Capturing information encoded in a MRL may be referred to herein as a "scan" of the MRL. A device that captures information encoded in the MRL may be referred to herein as a "scanning device."

When a scanning device scans the MRL, the scanning device may capture the information encoded in the MRL. For example, the scanning device may be directed to the URL encoded in the MRL. An MRL may be visible from an exterior of the tag. For example, an MRL may be printed on an exterior of a housing of the tag. The MRL may encode a second scan destination.

Based on scanning information encoded in an MRL or RFID chip, a scanning device may be redirected to a scan destination. The information encoded in an MRL or RFID chip may be associated with a default scan destination. For example, the information encoded in an MRL or RFID chip may include a URL. In some embodiments, the information encoded in an MRL or RFID chip may not be changeable. For example, an MRL may be printed on a substrate and an RFID chip may not be reprogrammable. Nevertheless, a scan destination associated with the MRL or RFID chip may be configurable (e.g., associated with customized content) after the MRL or RFID chip is manufactured and distributed.

Scanning an MRL or RFID chip may submit a default scan destination encoded therein to a redirect system. The redirect system may be a software application resident on the scanning device. The redirect system may be a cloud-based application hosted on a remote computer server. The redirect system may formulate content for display on the scanning device or trigger an action on the scanning device in response to receiving the default scan destination. The redirect system may formulate the content or trigger the action autonomously based on captured scan event details and applying one or more artificial intelligence algorithms to the received default scan destination and captured scan event details.

The redirect system may include a user interface ("UI"). The UI may provide access to software tools for an owner of an electronic tag to customize content associated with a default scan destination encoded in an MRL or RFID chip. The UI may allow content/actions displayed or triggered on a scanning device in response to a scan to be manually customized by the owner. For example, the user may link a first scan destination to the default scan destination encoded in an MRL of an electronic tag. The user may link a second scan destination to the default scan destination encoded in an RFID chip of the electronic tag. The user may link a third scan destination when a scan of both the MRL and RFID chip are captured by a scanning device within a threshold time interval.

The UI may allow the owner to define rules that will customize content/actions displayed or triggered on a scanning device in response to a scan based on a configuration setting, hardware or software associated with a scanning device. The UI may allow the owner to define rules that will customize content/actions displayed or triggered on a scanning device in response to a scan based on one or more scan event details. The UI may allow the owner to define rules that will customize content/actions displayed or triggered on a scanning device in response to capturing two or more scans (e.g., scanning MRL and RFID chip of an electronic tag).

A default scan destination may encode a unique identifier that identifies an MRL or RFID chip. The redirect system may link content to a default scan destination and allow the linked content to be customized over-the-air at any time. An illustrative redirect system is described in U.S. Pat. No. 11,120,095, titled "Refactoring of Static Machine-Readable Codes" and issued on Sep. 14, 2021, which is hereby incorporated by reference herein in its entirety.

A scanning device may be redirected to the first scan destination encoded in the RFID chip in response to a first scan of the RFID chip. The first scan may include utilizing near-field-communication protocols to capture the first scan destination stored on the RFID chip. A scanning device may be redirected to a second scan destination in response to a second scan of the MRL. For example, in response to scanning a RFID chip, contact information encoded on the RFID chip may be transferred to the scanning device. In response to scanning an MRL, the scanning device may be linked to a social media profile encoded in the MRL.

Capture of the first scan may cause the scanning device to formulate a first set of scan event details. Capture of the second scan may cause the scanning device to formulate a second set of scan event details. Scan event details may include identifying whether a scanning device has captured information by scanning a RFID chip or an MRL. The scanning device may identify a source of captured information based on an identifier or other indicator encoded in the captured information.

For example, the first scan destination encoded in the RFID chip may include a query parameter n=0 or other suitable value. This query parameter may be parsed out by the scanning device. The query parameter may be parsed out by a redirect-service that receives the captured information from the scanning device. The query parameter may correspond to a unique identifier associated with information encoded in a RFID chip. The query parameter may correspond to a unique identifier associated with information encoded in a specific RFID chip.

The second scan destination encoded in the MRL may not include a query parameter. Absence of the query parameter may identify an MRL as a source of captured information. In some embodiments, the second scan destination encoded in the MRL may include a query parameter n=1 or any other suitable value. This query parameter may be parsed out by the scanning device. The query parameter may be parsed out by a redirect-service that receives the captured information from the scanning device. The query parameter may correspond to a unique identifier associated with information encoded in an MRL. The query parameter may correspond to a unique identifier associated with information encoded in a specific MRL.

Other illustrative scan event details may include a scan time, scan location, weather at the scan time, biometric and physiological characteristics, (fingerprint, facial scan, heart rate) and demographic information. Scan event details may be determined by the scanning device. For example, in addition to scanning an RFID tag or MRL, the scanning device may capture a timestamp, a GPS location and a user facial scan.

Scan event details may include day of week included in the time stamp associated with the scan, day of month included in the time stamp associated with the scan, time of day included in the time stamp associated with the scan, proximity to a certain holiday or other pre-determined day, an identifier of a scanning device (e.g., international mobile equipment identifier or "IMEI number"), type of scanning device, operating system of scanning device, relevance to current events (which may be determined from news or other information sources), or other suitable scan event details. A type of scanning device may include a manufacturer of the scanning device, model number of the scanning device or other relevant details associated with the scanning device.

A MRL may be scannable by a scanning device in a line-of-sight of a first side of an electronic tag. For example, the MRL may be printed on the first side of the electronic tag. A second side of the electronic tag may be affixed to a substrate. The electronic tag may be affixed to a substrate using any suitable method or apparatus. For example, the second side of the electronic tag may include a magnetic surface. The magnetic surface of the tag may adhere to a ferromagnetic substrate. Utilizing a magnetic surface may allow a user to easily affix and remove tags from a substrate.

Some embodiments may include a base. The base may be affixed to a substrate. A housing of the tag may be releasably attached to the base. For example, the housing may snap into the base or be magnetically attached to the base. The base may be configured to hold one or more tags.

A second side of the electronic tag may include an adhesive for mounting the tag on a substrate. The electronic tag may be mounted to a substrate using the adhesive. In some embodiments, the electronic tag may include an MRL positioned underneath the adhesive. The MRL may be visible and scannable through the adhesive. Such embodiments may allow the electronic tag to be mounted behind a clear surface and the MRL scannable visible through the clear surface.

In some embodiments, a tag may only include an MRL. Such tag embodiments may not include an RFID chip embedded within the tag. Tag embodiments that only include an MRL may not include any electronic components. For example, tag embodiments may only include an MRL printed on an exterior of the tag. The MRL may be scannable after the tag is affixed to or mounted on a substrate. Tag embodiments may include two or more MRLs printed on the tag or otherwise scannable by a scanning device. For example, one MRL may be printed on a first side of the tag and a second MRL may be printed on a second side of the tag.

Tag embodiments that do not include an RFID chip may include other electronic components, such as an electronic screen. An electronic screen may be powered by battery included within the tag. The electronic screen may be supported by a housing of the tag. The tag may include internal memory for storing images of one or more MRLs. The tag may include a microprocessor or other circuitry that controls display of the one or more MRL images on the electronic screen. For example, the microprocessor may display a different MRL image on the electronic screen based on a time of day, location, or other instructions programmed into the microprocessor.

In some embodiments, a tag may include an RFID chip that only communicates with a scanning device that has been linked to the RFID chip. The RFID chip may only be used by the linked scanning device to transfer one or more MRL images that will be stored and displayed on the tag. Access to the RFID chip may be locked or password protected to prevent an unauthorized scanning device from accessing the RFID chip.

The microprocessor may dynamically control display of two or more MRLs images stored on the tag based on location, time or any other scan event detail. In some embodiment, the tag itself may detect a scan event detail. In some embodiment, the tag may receive display instructions or scan details from a linked scanning device.

After scanning a MRL or RFID chip, a scanning device may be redirected to a third scan destination. The third scan destination may be different from the first scan destination encoded in the RFID chip. The third scan destination may be different from the second scan destination encoded in the MRL.

The scanning device may transfer information captured by scanning a RFID chip or MRL to a computer server. The computer server may be programmed to look for a unique identifier included in the captured information. Based on the unique identifier, the computer server may formulate and respond to the scanning device with custom content or redirect the scanning device to a different URL or other third scan destination. A custom scan destination may be determined based on the unique identifier encoded in the RFID chip or MRL. Custom content may be dynamically adjusted based on captured scan event details or viewer activity after being redirected to a custom scan destination.

For example, scanning a MRL that encodes the unique identifier "123" may be directed to a first landing page. Scanning a MRL that encodes the unique identifier "124" may be directed to a second landing page. Such a scheme may enable conduct of A/B testing of different scan modalities (e.g., MRL or RFID chip) or different scan destinations. This scheme may enable generation of comparative analytics for different scan destinations based on a source of the captured information. For example, identifying whether a scanning device has captured information from a RFID chip or an MRL allows analysis of MRL scanning activity compared to RFID chip scanning activity.

The scanning device may be redirected to a third scan destination in response detecting a scan of both the MRL and the RFID chip. The scanning device may be redirected to a third scan destination based on a sequential order of scanning the MRL and RFID chip. For example, if the MRL is scanned before the RFID chip, the scanning device may be redirected to landing page A. If the RFID chip is scanned before the MRL, the scanning device may be redirected to landing page B.

The scanning device may be redirected to a third scan destination in response to scanning a RFID chip within a threshold time of scanning an MRL. Scanning both the RFID chip and MRL may itself be a scan event detail. A time difference between the scan of the RFID chip and scan of the MRL may also be a scan event detail.

Machine learning algorithms may be deployed to determine custom content that will be provided in response to a scan. Illustrative machine learning algorithms that may be utilized include AdaBoost, Naive Bayes, Support Vector Machine, Random Forests, Artificial Neural Networks, Deep Neural Networks and Convolutional Neural Networks.

Custom content provided in response to a scan may be determined based on one or more captured scan event details. Scan event details may be captured by a cookie resident on a browser of a scanning device. Scan event details may be captured by a tracking pixel resident on a webpage visited by a scanning device. Scan event details captured by a cookie or tracking pixel stored on the scanning device.

A scanning device may be a first scanning device. When the first scanning device captures a scan of an RFID chip, the first scanning device may be directed to a first scan destination. The first scan destination may be encoded in the scanned RFID chip. A second scanning device may scan the same RFID chip scanned by the first scanning device. The second scanning device may be redirected to a second scan destination. The second scan destination may be encoded in an MRL. The second scanning device may be redirected to the second scan destination even though the second scanning device did not scan the MRL.

The first scanning device may be associated with a first device type. The second scanning device may be associated with a second device type. A redirect system may redirect a scanning device to any suitable scan destination in response to detecting capture of a scan of an RFID chip or MRL. The redirect system may redirect a scanning device to any suitable scan destination based on one or more scan event details captured in connection with a scan of an RFID chip or MRL.

When a scanning device captures a first scan of an RFID chip, the scanning device may autonomously trigger activation of hardware on the scanning device for capture of a second scan of an MRL. An MRL may be scannable using a camera. The instructions captured by the scanning device from the RFID chip may include executable instructions that activate a camera of the scanning device. Capture of a first scan of an MRL may autonomously trigger activation of hardware on the scanning device for capture of a second scan of an RFID chip. For example, the instructions captured by scanning the MRL may include executable instructions that activate an NFC chip and instruct a user of the scanning device to "tap" or bring the scanning device within NFC range of the electronic tag.

In some embodiments, an electronic tag may include a passive RFID chip. The scanning device may provide power to the RFID chip to capture a scan. In some embodiments, the electronic tag may include a battery that powers the RFID chip. In some embodiments, the electronic tag may include a screen. The screen may be powered by the battery. The screen may electronically display a MRL that is scannable by a scanning device.

An RFID chip embedded in an electronic tag may be include any suitable communication circuitry for communicating with a scanning device. For example, the RFID chip may communicate with a scanning device using a Bluetooth low energy or other suitable communication protocols. Other illustrative communication protocols may include a machine-to-machine ("M2M") communication protocols, HyperText Transfer Protocol ("HTTP"), Simple Object Access Protocol ("SOAP"), REpresentational State Transfer ("REST") protocol, Constrained Application Protocol ("CoAP"), IEEE 802.15.4 based protocols (e.g., "ZigBee") and IEEE 802.11 based protocols (e.g., "Wi-Fi").

An artificial intelligence ("AI") method for dynamically redirecting a scanning device to a target scan destination is provided. The AI method may include monitoring for capture of a first scan of a machine-readable label ("MRL"). The MRL may be displayed on any suitable surface. For example, the MRL may be displayed electronically on a screen of an electronic tag. The MRL may be printed on an exterior surface of a housing of the electronic tag.

Methods may include monitoring for capture of a second scan of a radio-frequency identification ("RFID") chip embedded within the housing. Methods may include formulating a target landing page in response to detecting the capture of the first scan. The target landing page may be formulated based on capture of the first scan relative to the capture or non-capture of a second scan. A target landing page may be formulated based on whether the RFID chip or MRL has been scanned. A target landing page may be formulated based on one or more scan event details associated with a scan. Methods may include redirecting a scanning device to the target landing page.

Methods may include detecting capture of the second scan of an MRL before detecting capture of the first scan of an RFID chip. Methods may include formulating the target landing page based on the detected sequence of capturing the second scan before the first scan. Methods may include detecting capture of the second scan of the MRL within a threshold time after detecting capture of the first scan of the RFID chip. Methods may include formulating the target landing page based on the threshold time.

Methods may include formulating the target landing page based on first information captured from the MRL and second information captured from the RFID chip. The first and/or second information may be captured from the MRL or RFID chip by the scanning device. The scanning device may transfer the captured information to a redirect system. The redirect system may determine whether the received information has been captured from an MRL or RFID chip. The redirect system may provide, to the scanning device, a first landing page when the information has been captured from an RFID chip. The redirect system may provide, to the scanning device, a second landing page when the information has been captured from an MRL.

Methods may include, detecting the non-capture of the second scan. For example, methods may include detecting that after a first scan of an RFID chip embedded in an electronic tag, a subsequent second scan of an MRL printed on the electronic tag was not captured within a threshold time after the first scan of the RFID chip. Methods may include formulating the target landing page based on the non-capture of the second scan of the MRL within the threshold time after the first scan of the RFID chip.

An artificial intelligence ("AI") redirect system is provided. The AI redirect system may dynamically redirect a scanning device to a target landing page in response to detecting capture of a scan of RFID chip. The RFID chip may be embedded within a housing. For example, electronic components of the RFID chip may be embedded between two layers of a plastic housing. The AI redirect system may dynamically redirect a scanning device to a target landing page in response to detecting capture of a scan of MRL. The MRL may be visible from an outside the housing.

The system may include a MRL generator. An illustrative MRL generator is described in U.S. Pat. No. 11,010,650, entitled "Machine-Readable Label Generator" and issued on May 18, 2021, which is hereby incorporated by reference herein in its entirety. The MRL generator may allow a user to customize the appearance of an MRL and content presented in response to a scan of the MRL. The MRL generator may be programmed such that a custom library of design choices (e.g., images, colors and shapes), custom content options and restrictions are available for MRLs created suing the MRL generator. The MRL generator may be accessed by an application program interface.

The system may include a redirect system. An illustrative redirect system is described in U.S. Pat. No. 11,120,095, titled "Refactoring of Static Machine-Readable Codes" and issued on Sep. 14, 2021, which is hereby incorporated by reference herein in its entirety. The redirect system may dynamically generate a customized landing page in response to receiving a scan of a MRL, RFID chip or any other machine-readable code.

The redirect system may include a processor and a non-transitory memory with instructions stored thereon. The instructions, when executed by the processor, may cause the processor to redirect a scanning device to target content formulated in response to capturing a scan or an MRL or RFID chip. The redirect system may be resident as an application on a scanning device.

The redirect system may compute a scan destination for a scanning device based on whether the scanning device captures a first scan of the RFID chip or a second scan of the MRL. The scan destination computed by the redirect system may be different from a URL (or any other scan destination) encoded in a scanned MRL. The scan destination computed by the redirect system may be different from a URL (or any other scan destination) encoded in a scanned RFID chip.

The scan destination computed by the redirect system may be determined based on one or more scan event details associated with a captured scan. For example, the scan destination computed by the redirect system may be determined based on a device type associated with the scanning device.

Apparatus and methods in accordance with this disclosure will now be described in connection with the figures, which form a part hereof. The figures show illustrative features of apparatus and methods in accordance with the principles of this disclosure. It is understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus described herein.

Apparatus embodiments may omit features shown and/or described in connection with illustrative apparatus. Apparatus embodiments may include features that are neither shown nor described in connection with illustrative apparatus. Features of illustrative apparatus embodiments may be combined. For example, an illustrative apparatus embodiment may include features shown or described in connection with any other illustrative apparatus and/or method embodiment described herein.

FIG. 1 shows illustrative machine-readable optical label 100. MRL 100 includes data zone 101. Data zone 101 includes light and dark modules that encode executable instructions. MRL 100 includes alignment marker 103. Alignment marker 103 is defined by an outer border that includes light and dark modules, an inner border of light modules and a dark module in the center.

MRL 100 also includes position markers 105, 109 and 115. Position marker 105 is in a top-right corner of data zone 101. Position marker 105 includes an outer square-shaped border of dark modules and an inner border of light modules surrounding diamond-shaped core 106 of dark modules. Position marker 109 is in a top-left corner of data zone 101. Position marker 109 includes an outer circular-shaped border of dark modules and an inner border of light modules surrounding diamond-shaped core 108 of dark modules.

Position marker 115 is in a bottom-left corner of data zone 101. Position marker 115 includes an outer shaped border that includes three lines of dark modules. Position marker 115 includes a FLOWCODE logo as part of the outer border. Position marker 115 includes an inner border of light modules surrounding square-shaped core 116 of dark modules.

MRL 100 includes environmental zone 113. Environmental zone 113 includes modules that are not interpreted when MRL 100 is scanned. Environmental zone 113 may include all parts of MRL 100 outside of data zone 101. Environmental zone 113 has been constructed such that it has an appearance that, to a human eye, seems contiguous with the modules of data zone 101. Environmental zone 113 may be constructed such that it does not interfere with the scanning of data zone 101. Environmental zone 113 includes buffer 111. Buffer 111 includes light modules that space data zone 101 apart from modules of environmental zone 113. MRL 100 includes circular border 107. Border 107 may be included in environmental zone 113.

MRL 100 may be displayed on a screen. A viewer may scan MRL 100 using a scanning device such as a mobile device. Data zone 101 may encode any suitable information such as a uniform resource locator ("URL"), link to a social media profile, contact information associated with a business or other alphanumeric information. Data zone 101 may encode instructions, that when scanned, trigger the scanning device to perform a target action or function. The information encoded in data zone 101 may be captured or read by a native application or a third-party application running on the scanning device.

Data zone 101 may conform to an encoding specification for a Quick Response ("QR") code. MRLs described in connection with this disclosure may be any suitable scannable machine-readable code. Other illustrative machine-readable codes include any suitable linear or two-dimensional matrix barcodes, such as Aztec code, ShotCode, SPARQCode, and the like. Other illustrative machine-readable codes include any suitable one dimensional or three-dimensional machine-readable codes.

Data zone 101 may encode a set of instructions that may be repeatedly scanned by multiple viewers and/or scanning devices. For example, MRL 100 may be printed on multiple electronic tags. Each of scan of MRL 100 may capture the identical information from data zone 101. Even though each scanning device may capture the same information from data zone 101, the particular content that is presented on a scanning device may be dynamically customized based on a scan location, scan time, scanning device type or any other suitable scan event detail.

Figure 2:
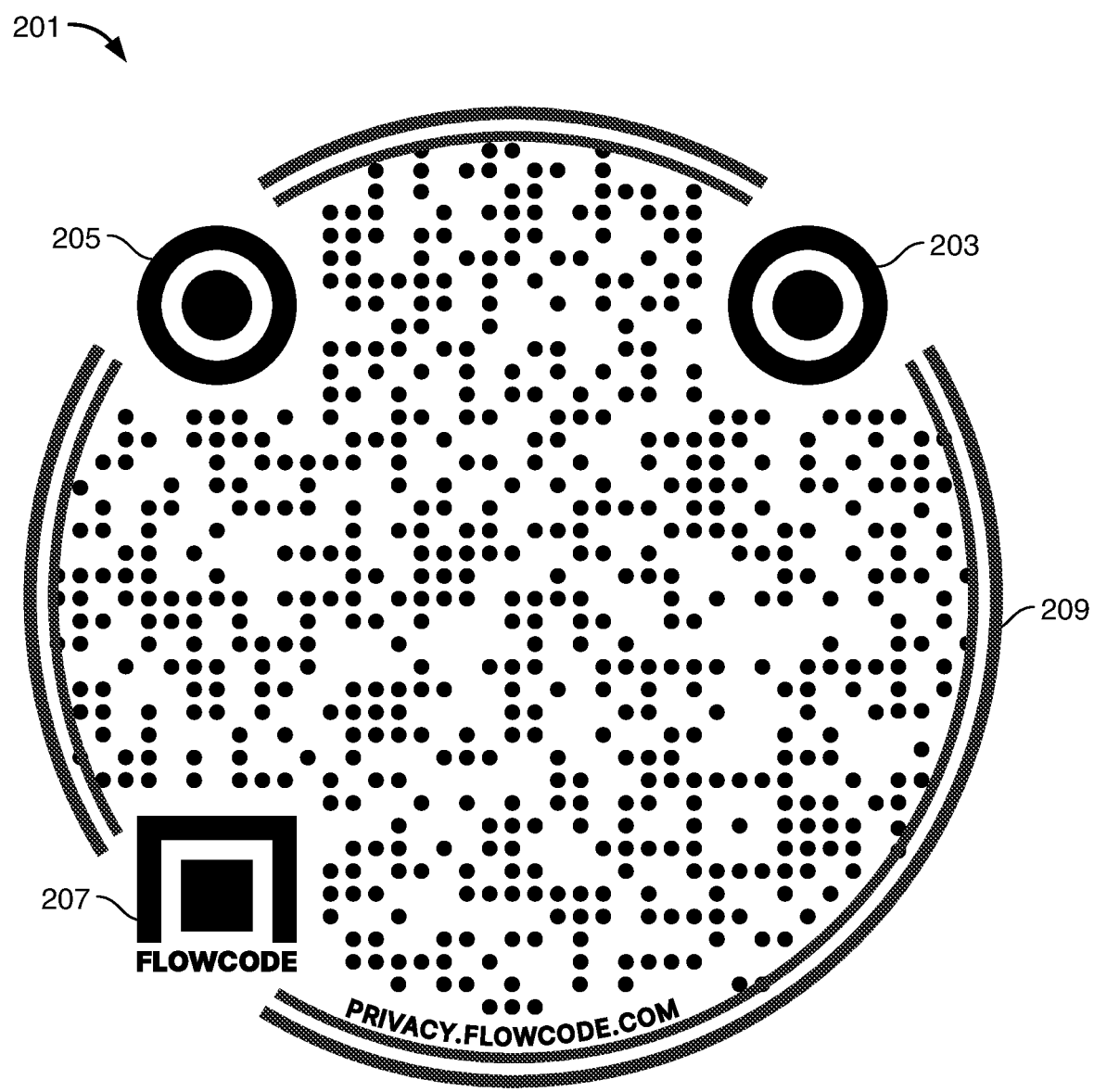
FIG. 2 shows an illustrative machine-readable label in accordance with principles of the disclosure.

FIG. 2 shows illustrative MRL 201. MRL 201 is optimized for scan recognition when displayed electronically. For example, when displayed electronically, MRL 201 may be reliably scannable by a greater number of scanning devices compared to MRL 100 (shown in FIG. 1). A benchmark level of scan reliability may be defined as capturing information encoded in a data zone of an MRL within a threshold time (e.g., 100 milliseconds) by a threshold number of scanning devices (e.g., Android and iOS devices). Electronically displaying MRL 201 may include presenting MRL 201 on a screen, using a light source, holographically or any other electronic presentation.

To optimize scan-ability when MRL 201 is presented electronically, outer border 209 includes breaks at position markers 203, 205 and 207. To optimize scan-ability when MRL 201 is presented electronically, one or more of position markers 203, 205 and 207 may protrude beyond outer border 209. MRL 201 may include a data zone that conforms to an encoding specification for a Quick Response ("QR") code or any other suitable linear or two-dimensional matrix barcodes, such as Aztec code, ShotCode, SPARQCode, and the like.

Figure 3:
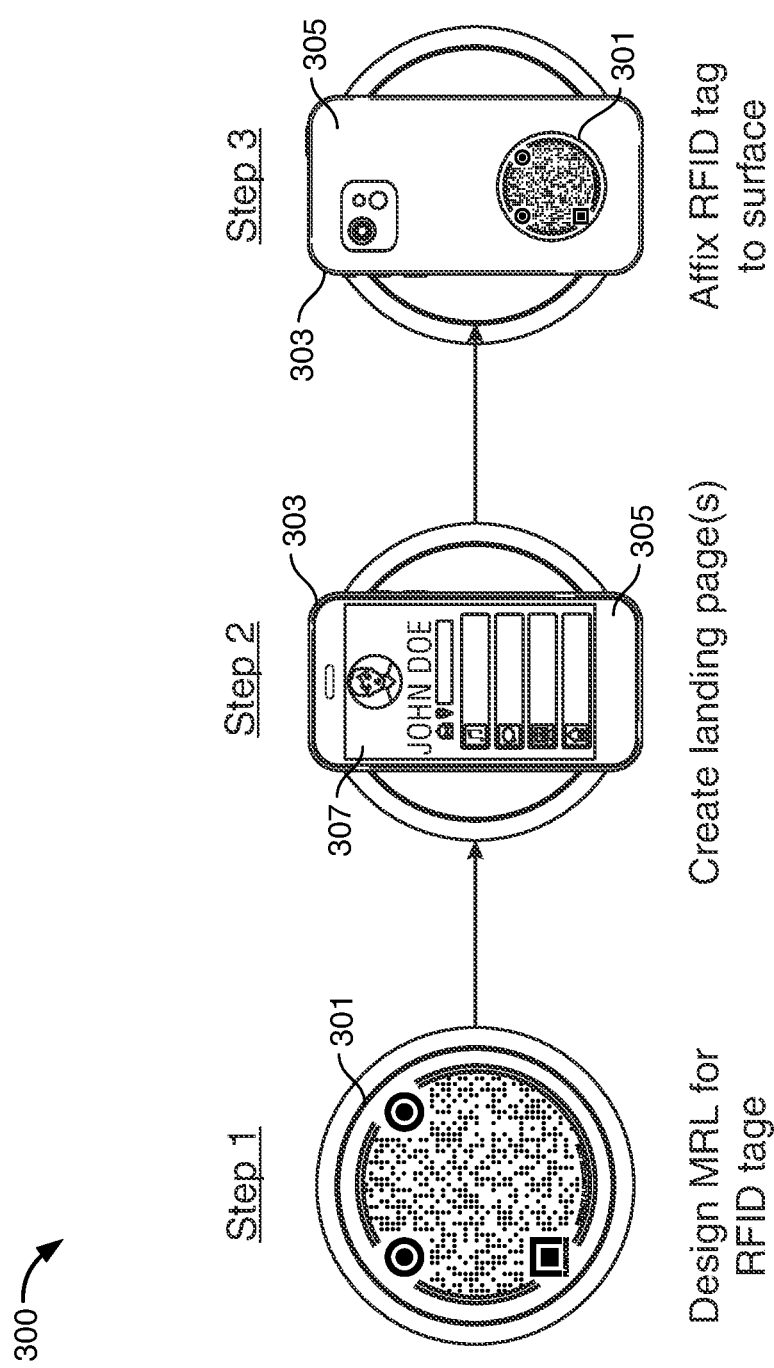
FIG. 3 shows an illustrative process and apparatus in accordance with principles of the disclosure.

FIG. 3 shows illustrative process 300. Process 300 begins at step 1. At step 1 a user may custom design electronic tag 301. Custom designing electronic tag 301 may include designing MRL 201 that is printed on an on an exterior surface of electronic tag 301. MRL 201 may be produced using an a MRL generator.

An illustrative MRL generator is described in U.S. Pat. No. 11,010,650, entitled "Machine-Readable Label Generator" and issued on May 18, 2021, which is hereby incorporated by reference herein in its entirety. The aforementioned MRL generator may allow a user to customize the appearance of an MRL and content presented to a viewer that scans the MRL. For example, the MRL generator may be programmed such that a custom library of design choices (e.g., images, colors and shapes), custom content options and restrictions are available to a user that uses the MRL generator to create an MRL. The MRL generator may be accessed by an application program interface. The MRL generator may generate an MRL optimized for scan recognition when the generated MRL is displayed electronically, such as on a screen.

Electronic tag 301 may include a RFID chip (not shown). The RFID chip may include an antenna and integrated circuit (IC). The RFID chip may be enclosed within a protective housing. MRL 201 may be printed on the housing that encloses the RFID chip.

At step 2, the user may create custom content 307 that will be linked to the MRL. Custom content 307 may include links to target webpages, social media profiles, custom colors, custom fonts, background images and any other suitable content. At step 3, the user affixes electronic tag 301 to surface 305 of mobile device 303. Surface 305 may be a back surface of mobile device 303 or a protective case for mobile device 303.

MRL 201 may encode a scan destination. The scan destination encoded in MRL 201 may be linked to custom content 307. When MRL 201 is scanned, custom content 307 may be presented on a scanning device. Apparatus and methods for linking an MRL to custom content are described in U.S. Pat. No. 11,120,095, titled "Refactoring of Static Machine-Readable Codes" and issued on Sep. 14, 2021, which is hereby incorporated by reference herein in its entirety.

The RFID chip included in electronic tag 301 may be scanned. Scanning the RFID chip may redirect a scanning device to a first instance of custom content associated with the electronic tag. MRL 201 printed on electronic tag 301 may be scanned. Scanning MRL 201 may redirect a scanning device to a second instance of custom content associated with electronic tag 301. Scanning both MRL 201 and the RFID chip may redirect a scanning device to a third instance of custom content associated with electronic tag 301.

Additional instances of custom content may be linked to electronic tag 301. The additional instances of custom content may be displayed based on scanning both the MRL 201 and the RFID chip in electronic tag 301. A redirect system may determine which instance of custom content to display to a scanning device in response to whether the scanning device captures a scan of MRL 201, the embedded RFID chip, both MRL 201 and the embedded RFID chip, a sequential order in which MRL 201 and the embedded RFID chip were scanned, or any suitable scan event detail.

Figure 4:
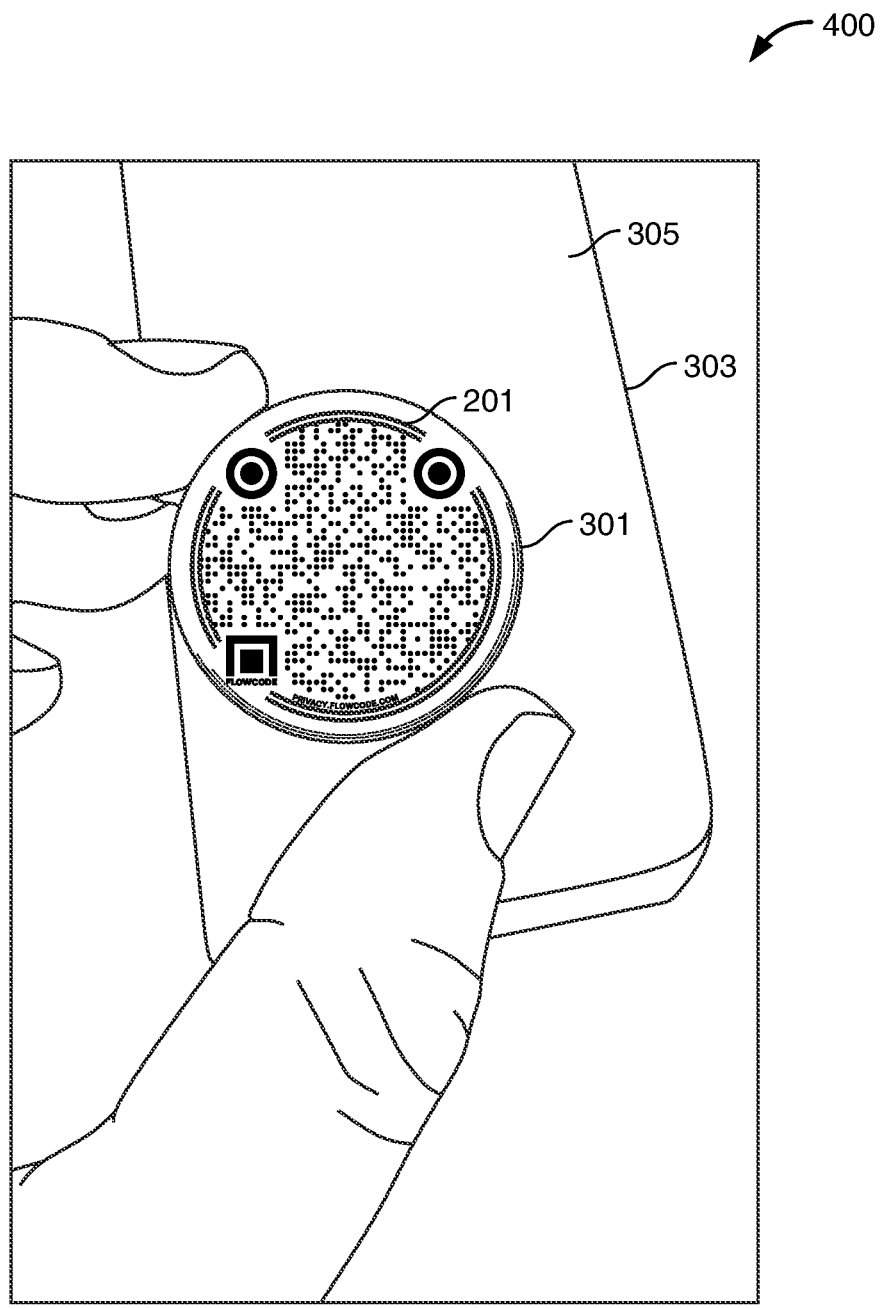
FIG. 4 shows illustrative scenario in accordance with principles of the disclosure.

FIG. 4 shows user 401 in the process of affixing electronic tag 301 to surface 305 of mobile device 303. After electronic tag 301 is affixed to mobile device 303, a scanning device may scan MRL 201 and/or scan the RFID chip embedded within electronic tag 301. For example, a scan of the RFID chip may transfer contact information to the scanning device. Scanning MRL 201 may link the scanning device to a social media profile.

Figure 5:
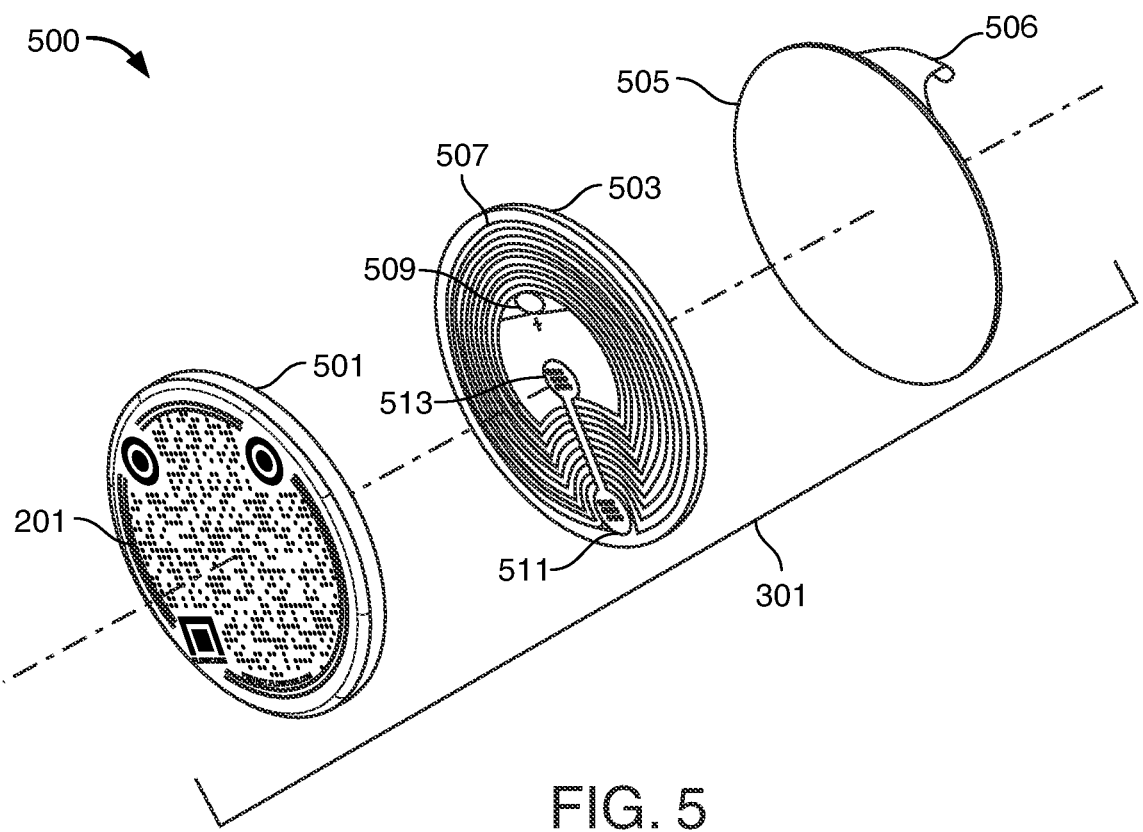
FIG. 5 shows illustrative apparatus in accordance with principles of the disclosure.

FIG. 5 shows exploded view 500 of electronic tag 301. View 500 shows housing 501. MRL 201 is printed on housing 501. View 500 showing RFID chip 503. Housing 501 may protect components of RFID chip 503. RFID chip 503 includes circuitry 511. Circuitry 511 may include a radiofrequency ("RF") analog front end. Circuitry 511 may include digital control circuitry that controls overall operation of RFID chip 503.

Digital control circuitry may include a microprocessor and/or one or more coprocessors. The coprocessors may perform specialized functions such as encryption or access restrictions. Digital control circuitry may include an application specific integrated circuit ("ASIC"). Circuitry 511 may also include non-volatile memory including internal random-access memory ("RAM") read-only memory ("ROM") for data storage.

The RF-analog front end may include subcomponents such as a voltage rectifier, a demodulator, a clock generator, a modulator, control logic and an internal clock. The rectifier may convert alternating current into direct current. The modulator may perform Amplitude Shift Keying ("ASK") of other techniques for converting one radio signal into another signal format. The demodulator may recover content from a modulated signal. The clock generator circuit may include an oscillator.

The control logic may switch electronic tag 301 between two or more operating modes. A first illustrative operating mode may monitor received input signals for a target data pattern. Such a target data pattern may include a request for information stored in memory bank 513. Memory bank 513 may store a scan destination or other information that may be provided to a scanning device. A second illustrative operating mode may control the process of electronic tag 513 providing data to a scanning device.

The RF front end may also include antenna 507 and associated circuitry for transmitting and receiving data. Antenna 507 may be constructed from aluminum or copper. Antenna 507 may be used for receiving signals from a scanning device. Antenna 507 may be used for transmitting signals to a scanning device. Antenna 507 may receive and reflect RF waves generated by a scanning device. A design of antenna 507 may be optimized based on a target frequency associated with a scanning device. Design of antenna 507 may determine an overall size of electronic tag 301. The circuitry associated with antenna 507 may include impedance matching that minimizes signal reflection between antenna 507 and other electronic components of electronic tag 301.

Electronic tag 301 may be an active RFID chip that includes optional battery 509. Electronic tag 301 may use battery 509 to amplify a signal received from or transmitted to a scanning device. An active RFID chip do not need to use an RF signal received from a scanning device to energize components to process and transmit data. Active RFID chips typically have a longer communication range relative to passive RFID chips. Active RFID chips may include circuitry for performing security protocols and encryption techniques.

Passive RFID chips may use RF signals received from a scanning device to power circuitry 511 and other components of RFID chip 503. Passive RFID chips may use energy in RF signals received from a scanning device to transmit data back to the scanning device. When a scanning device is positioned within a communication range of a passive RFID chip, the scanning device may generate an electromagnetic field that induces current flow in the passive RFID chip. The power provided by the scanning device allows the passive RFID chip to transmit data. Closer proximities of the scanning device and a passive RFID chip allow for a stronger electromagnetic field to affect the passive RFID chip. An illustrative communication range for a passive RFID chip less than or equal to 20 centimeters. An illustrative communication range for a passive RFID chip may be less than or equal to 6 meters, for scanning devices that are capable of generating a stronger electromagnetic field.

Electronic tag 301 includes backing 505. Housing 501 and backing 505 may collectively encapsulate and protect RFID chip 503. Backing 505 may be any suitable material such as paper or plastic (e.g., polypropylene). Backing 505 may include an adhesive layer. FIG. 5 shows that an adhesive layer may be covered by protective covering 506 and selectively exposed by peeling off protective covering 506. After being exposed, the adhesive layer by then be used to affix electronic tag 301 to a surface.

Figure 6:
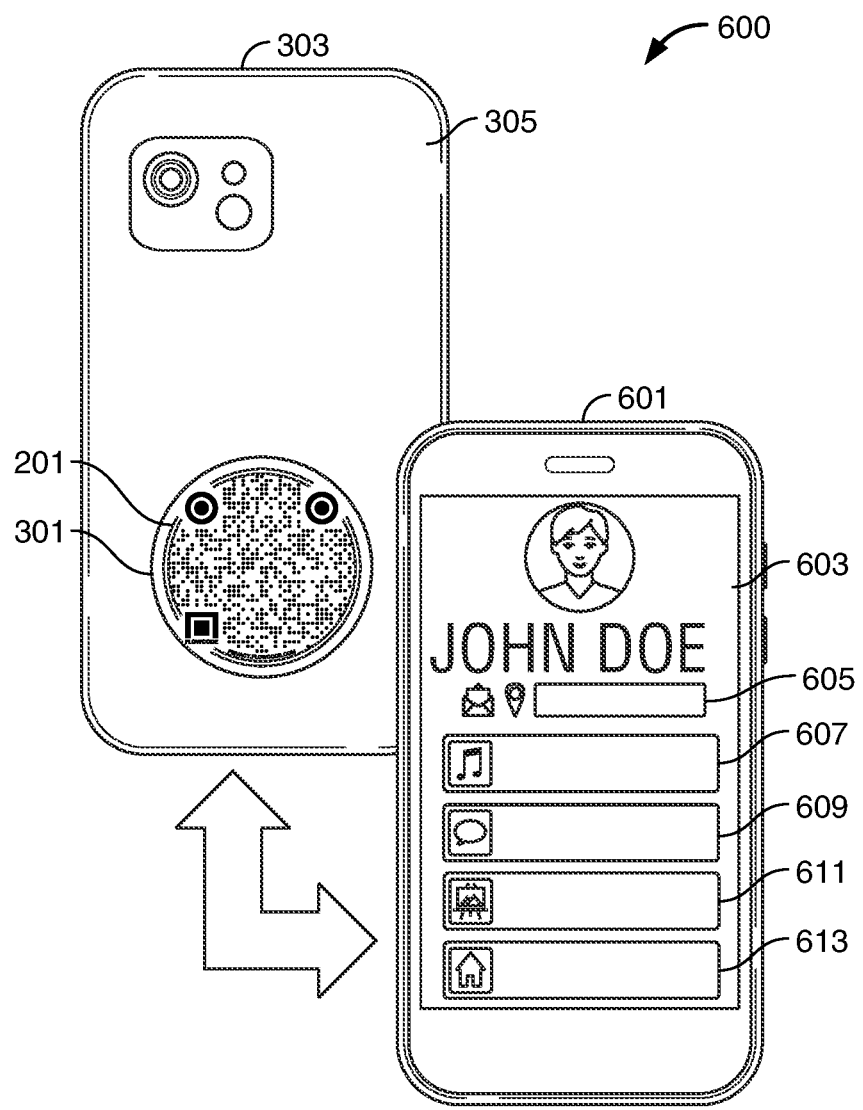
FIG. 6 shows an illustrative scenario in accordance with principles of the disclosure.

FIG. 6 shows illustrative scenario 600. Scenario 600 shows electronic tag 301 mounted on back surface 305 of mobile device 303. Scenario 600 shows that electronic tag 301 has been scanned by scanning device 601. Scanning device 601 may scan electronic tag 302 optically by scanning MRL 201 (shown in FIG. 5). Scanning device 601 may scan electronic tag 302 using RF signals to scan RFID chip 503 (shown in FIG. 5).

By scanning MRL 201 or RFID chip 503, scanning device 601 may capture information encoded within MRL 201 or stored within RFID chip 503. Scanning device 601 may transmit the captured information to a redirect system. The redirect system may formulate content to be displayed on scanning device 601 based on the captured information. The redirect system may formulate content for display on scanning device 601 based on one or more scan event details captured by scanning device 601 in a connection with scanning MRL 201 and/or RFID chip 503.

Illustrative scan event details may include identifying whether scanning device 601 has captured information by scanning RFID chip 503 or scanning MRL 201. Scanning device 601 may identify a source of captured information based on an identifier or other indicator in the captured information. For example, a first URL stored on RFID chip 503 may include a query parameter n=0 or other suitable value. A second URL encoded in MRL 201 may include a query parameter n=1 or other suitable value.

Other illustrative scan event details may include a scan time, scan location, weather at the scan time, biometric and physiological characteristics, (fingerprint, facial scan, heart rate) and demographic information. Scan event details may be determined by scanning device 601. For example, in addition to scanning RFID chip 503 or MRL 201, scanning device 601 may capture a timestamp, a GPS location and a user facial scan.

Illustrative scan event details may include a scanning device type. Illustrative examples of device type may include operating system of a scanning device (e.g., android, iOS), manufacturer (e.g., Apple, Samsung), capabilities of a camera (e.g., number of mega pixels) of the scanning device, or a hardware identifier of communication circuitry of the scanning device (e.g., a media access control ("MAC") address).

Scenario 600 shows that in response to scanning electronic tag 301, content 603 is displayed on scanning device 603. Content 603 may be provided to scanning device 601 via a redirect system. Scanning device 601 may be redirect to content 603 based on a URL included information captured as a result of scanning electronic tag 301.

Content 603 includes a landing page about "John Doe." Content 603 includes links to information associated with John Doe. Exemplary links may include contact information 605, music 607, social media profile(s) 609, photos 611 and John Doe's personal homepage 613. An order of links 605, 607, 609, 611 and 613 presented on scanning device 603 in response to a scan of electronic tag 301 may be dynamically determined by a redirect system.

Figure 7:
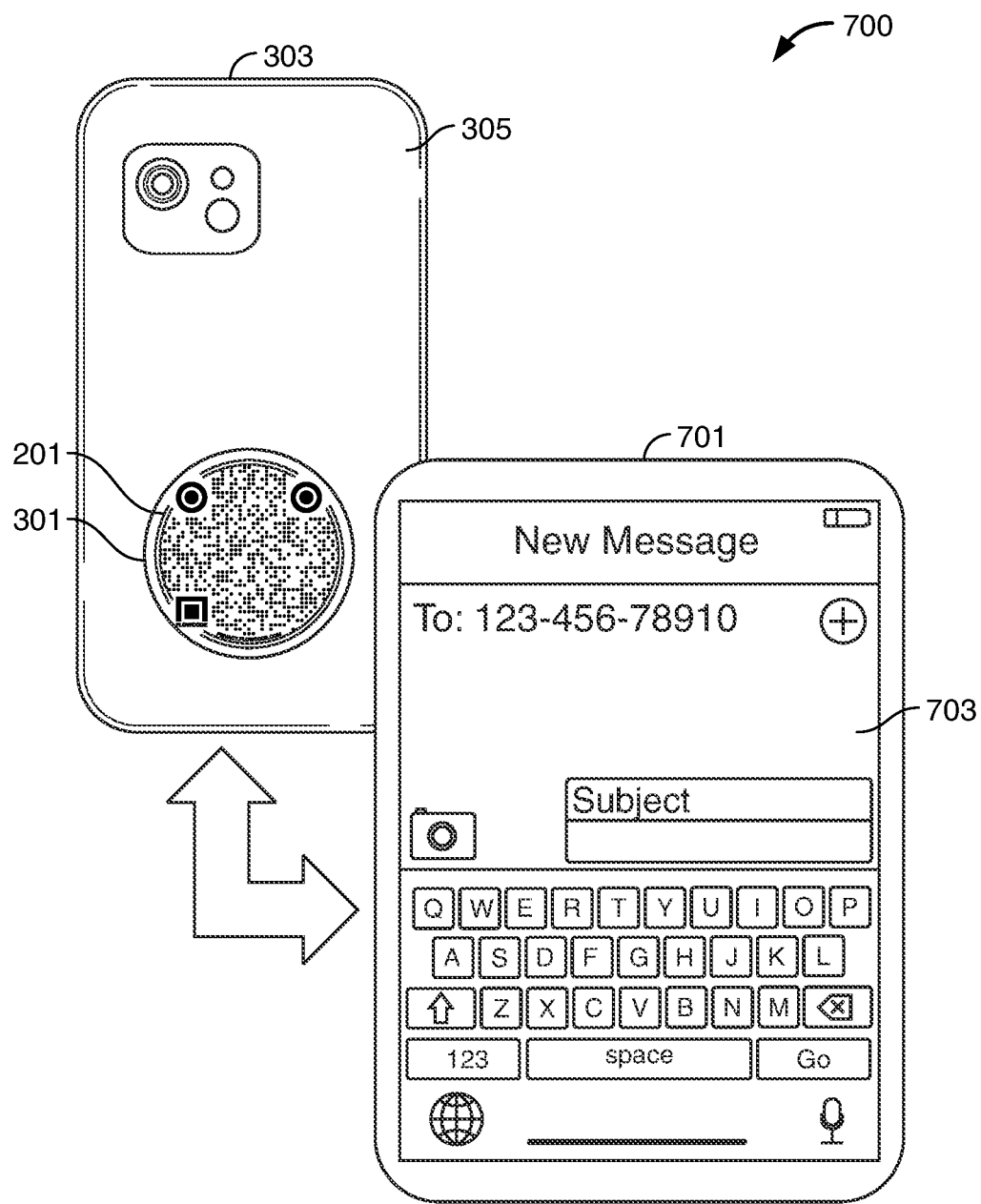
FIG. 7 shows an illustrative scenario in accordance with principles of the disclosure.

FIG. 7 shows illustrative scenario 700. Scenario 700 illustrates that different scanning devices may be presented with different content in response to scanning electronic tag 301. Scenario 700 shows that scanning device 701 has also scanned electronic tag 301. Scenario 700 shows that content 703 is displayed on scanning device 701 in response to scanning electronic tag 301. Content 703 includes a preformatted text message addressed to a target destination. In contrast, FIG. 6 shows that content 603 was presented on scanning device 601 in response to scanning device 601 scanning electronic tag 301. Content displayed in response to scanning electronic tag 301 may depend on any suitable scan event detail.

Figure 8:
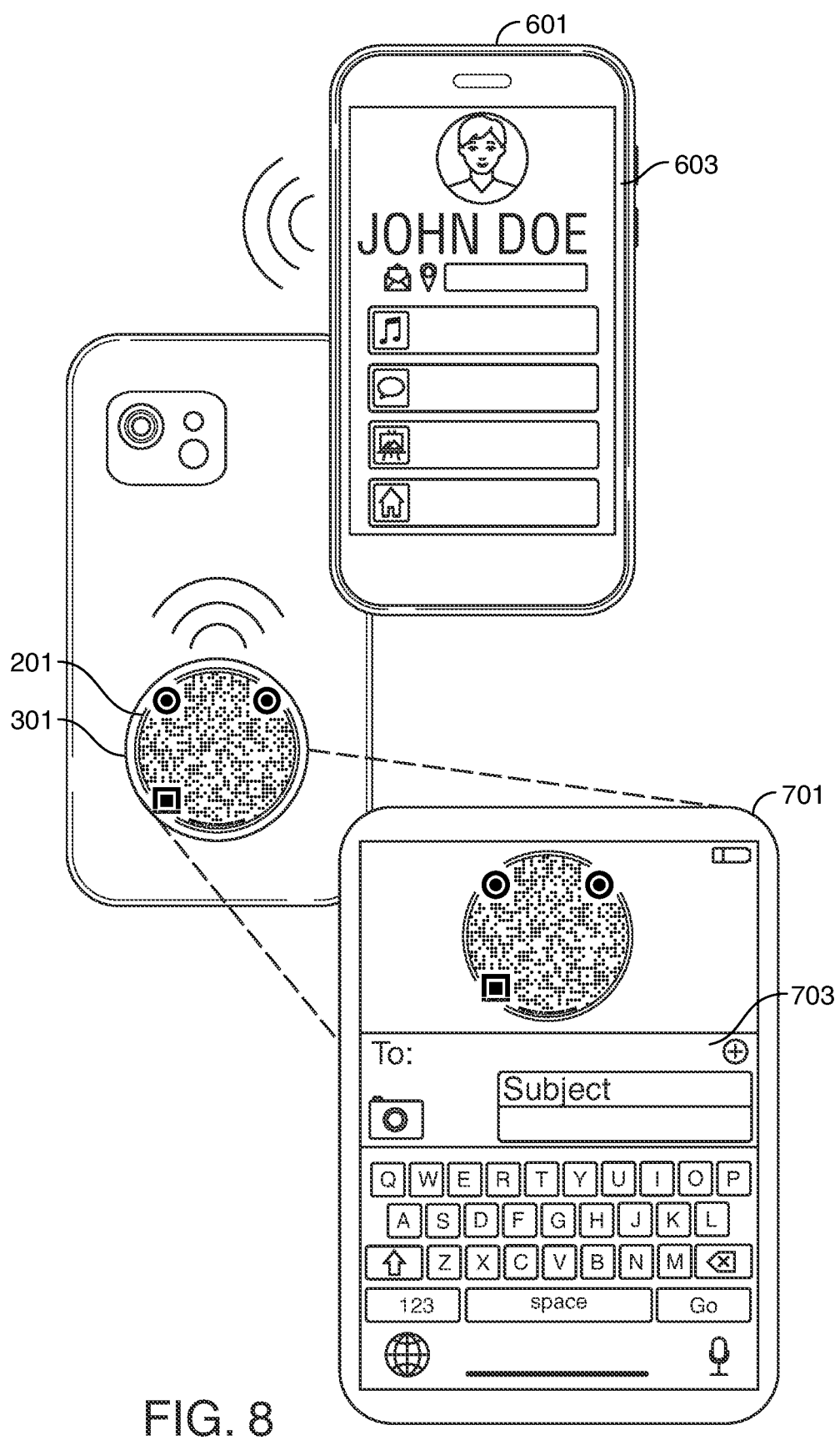
FIG. 8 shows an illustrative scenario in accordance with principles of the disclosure.

FIG. 8 shows illustrative scenario 800. Scenario 800 shows that scanning device 601 has captured a scan of electronic tag 301 by scanning RFID chip 503 embedded within electronic tag 301. In response to scanning RFID chip 503, content 603 is displayed on scanning device 601. Scenario 800 also shows that scanning device 701 has captured a scan of electronic tag 301 by scanning MRL 201 printed on housing 501 of electronic tag 301. In response to scanning MRL 201, content 703 is displayed on scanning device 701.

In other embodiments, any suitable permutation of scans of RFID chip 503 and/or MRL 201 may be used to formulate content displayed on a scanning device. For example, when scanning device 601 captures a scan of MRL 201 and a scan of RFID chip 503 within a threshold time, a redirect system may formulate custom content for display on scanning device 601. Table 1 below lists illustrative scan permutations of RFID chip 503 and MRL 201:

TABLE 1

| Illustrative Scan Permutations | | | |
|---|---|---|---|
| Scan −n | Scan 0 | Scan 1 | Scan n |
| — | MRL 201 | — | — |
| — | MRL 201 | RFID chip 503 | — |
| — | MRL 201 | MRL 201 | — |
| — | RFID chip 503 | — | — |
| — | RFID chip 503 | MRL 201 | — |
| — | RFID chip 503 | RFID chip 503 | — |
| — | MRL 201 | RFID chip 503 | MRL 201 |
| RFID chip 503 | MRL 201 | RFID chip 503 | MRL 201 |

In table 1, "scan −n" represents a historical scan or scan pattern that occurred before scan 0. "Scan n" represents a future scan or scan pattern that occurs after scan 2.

Figure 9:
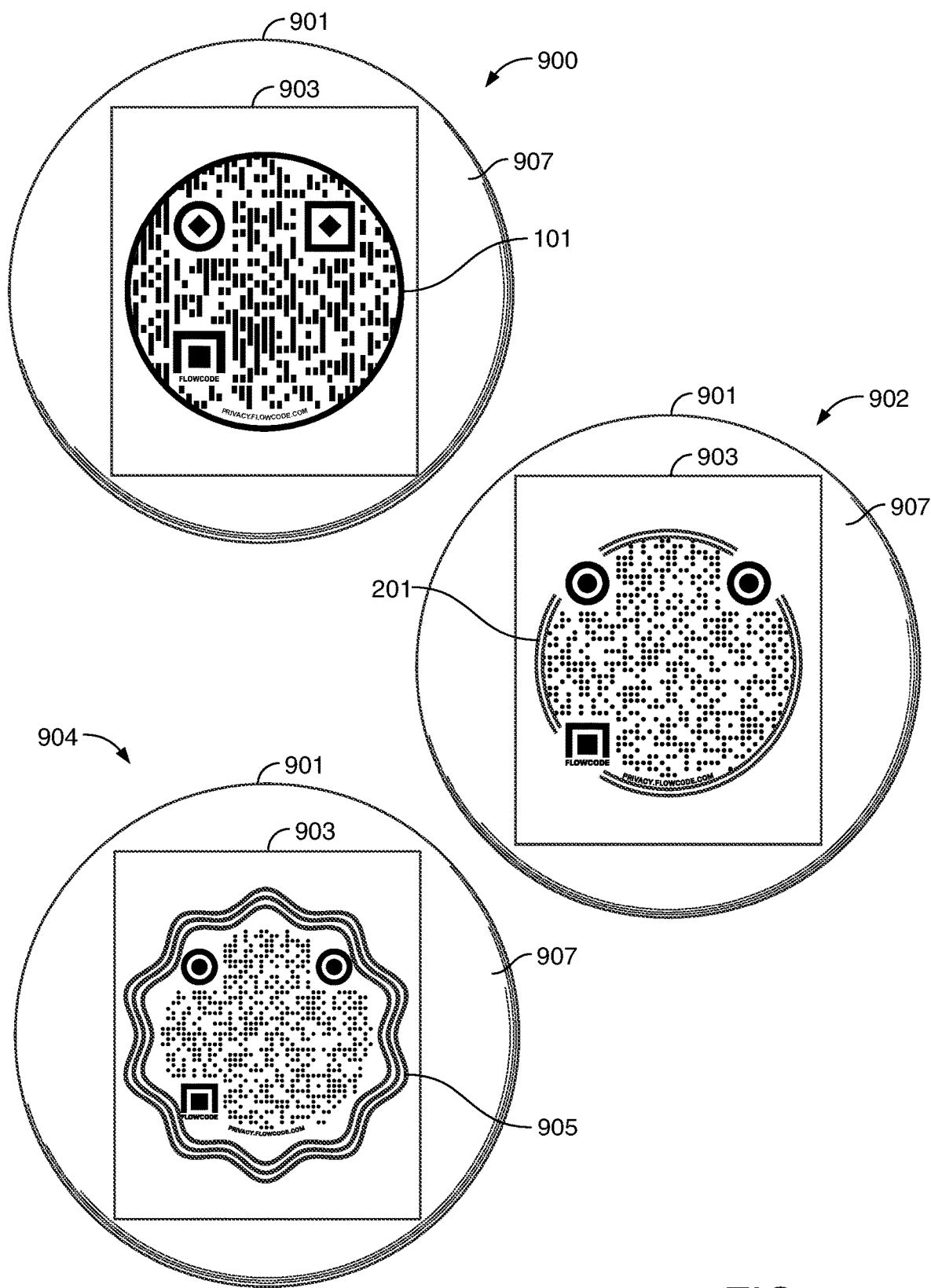
FIG. 9 shows illustrative apparatus in accordance with principles of the disclosure.

FIG. 9 shows illustrative views 900, 902 and 904 of electronic tag 901. Electronic tag 901 may include one or more features of electronic tag 301 (shown in FIG. 3). For example, electronic tag 901 may include RFID chip 503. Electronic tag 901 also includes screen 903. Screen 903 may be powered by battery 509 (shown above in FIG. 5). Screen 903 may be supported by housing 907. RFID chip 503 may store images of one or more MRLs. For example, images may be stored in memory bank 513 (shown in FIG. 5). A stored image of a MRL may be presented on screen 903.

An image of an MRL may be transferred to RFID chip 503 by a scanning device. An image of an MRL may be transferred to RFID chip 503 by a device on which electronic tag 901 is mounted. Write access to a RFID chip within electronic tag 901 may be locked or password protected prevent an unauthorized device from storing information on the RFID chip within electronic tag 901. A MRL generator may generate an image of a custom designed MRL.

An image of an MRL may be written to an RFID chip embedded within electronic tag 901. A microprocessor within the embedded RFID chip may control display of the stored MRL image on screen 903. The microprocessor may control display of two or more MRLs images stored on the embedded RFID chip. The microprocessor dynamically control display of two or more MRLs images stored on embedded RFID chip based on location, time or other instructions received from a device on which electronic tag 901 is mounted.

For example, electronic tag 901 may be mounted on device 303 (shown in FIG. 3). The microprocessor of electronic tag 901 may display a first MRL image when device 303 is in a first location. The microprocessor may display a second MRL image when device 303 is in a second location. Device 303 may communication its current location to electronic tag 901 using NFC communication protocols. The first MRL image may encode different information than the second MRL image.

View 900 shows electronic tag 901 displaying MRL 101 on screen 903. View 902 shows electronic tag 901 displaying MRL 201 on screen 903. View 904 shows electronic tag 901 displaying MRL 905 on screen 903. Each of MRLs 101, 201 and 905 may be stored in memory bank 513 of RFID chip 503. Each of MRLs 101, 201 and 905 may encode different information than the second MRL image. A scanning device that scans MRL 101 may be redirected to a first scan destination. A scanning device that scans MRL 201 may be redirected to a second scan destination. A scanning device that scans MRL 905 may be redirected to a third scan destination.

A scan destination may include information that triggers any suitable function on a scanning device. For example, an illustrative scan destination may include information that triggers launching of a web browser resident on the scanning device and loading of a target landing page. Other illustrative functions triggered by a scan destination may include initiating a phone call or a video conference, launching an email/text application on the scanning device and formulating a pre-formatted message to a target destination. A function triggered by a scan destination may be based on one or more scan event details captured in connection with a scan.

Figure 10:
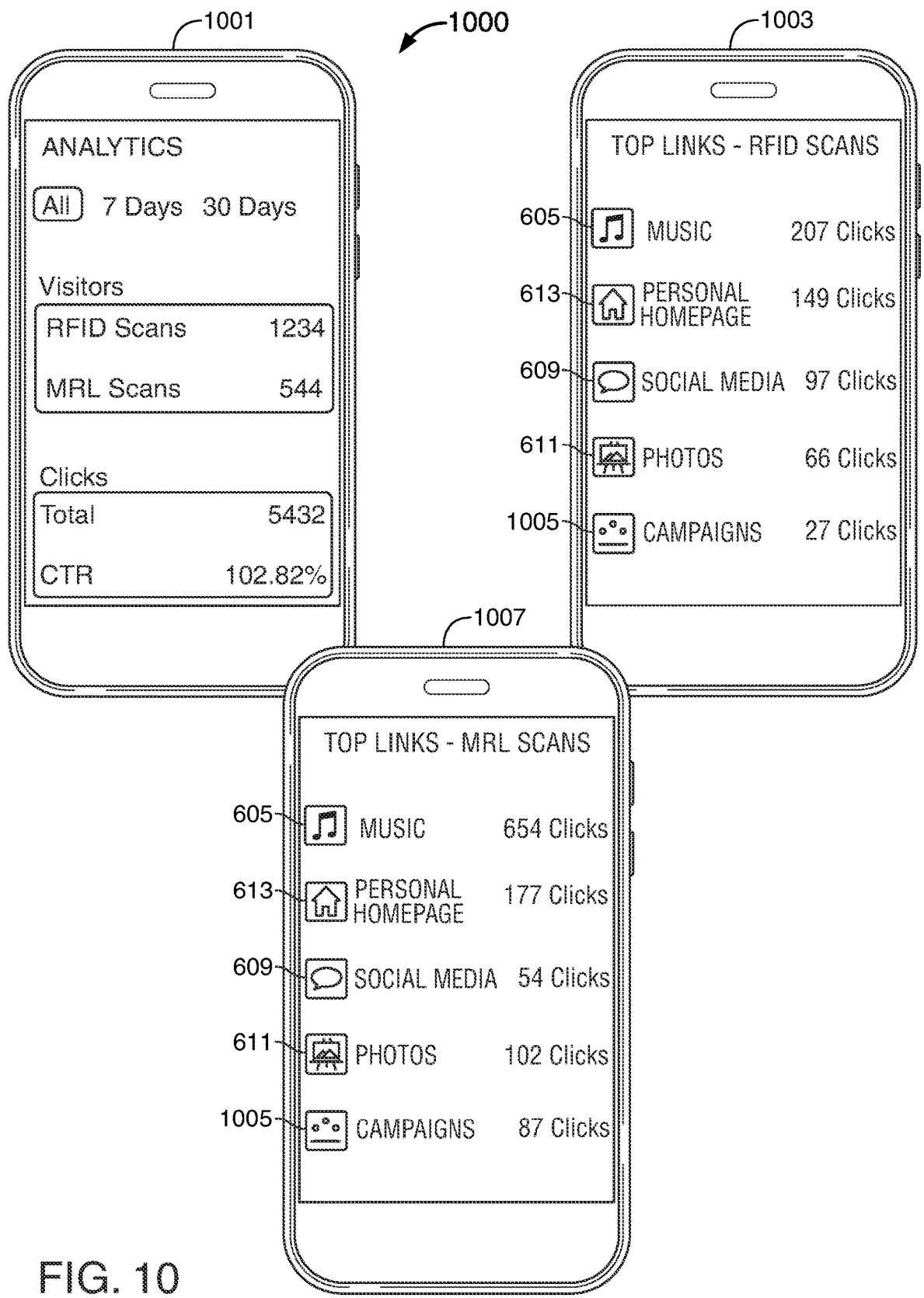
FIG. 10 shows an illustrative information generated in accordance with principles of the disclosure.

FIG. 10 shows illustrative performance metrics 1000 that may be captured based on user activity associated with content presented on a scanning device in response to scanning electronic tag 301. Illustrative performance metrics 1000 are shown regarding content 603 (shown above in FIG. 6). Performance metrics 1000 may be captured based on tracking code embedded in content 603.

Screenshot 1003 shows statistics corresponding to user interaction (measured in clicks) with content 603 when displayed on a scanning device in response to a scan of RFID chip 503. Screenshot 1007 shows statistics corresponding to user interaction (measured in clicks) with content 603 displayed on a scanning device in response to a scan of MRL 201. Screenshots 1003 and 1007 show user activity (measured in clicks) with respect to specific links 605, 613, 609 and 611 included within content 603.

A redirect system may change content displayed in response to a scan of an electronic tag based on performance metrics (e.g., performance metrics 1000) associated with content 603. Illustrative performance metrics associated with a scan destination may include time users spend on a presented landing page and user engagement with content presented on the landing (interaction with a chatbot or add to cart or other activity available on landing page). In response to a scan of an electronic tag, methods may include redirecting the scanning device to a target landing page that is associated with target performance metrics.

Thus, methods and apparatus for ELECTRONIC TAG HAVING TWO SCANNING MODALITIES are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An electronic tag comprising:
a housing;
a radio-frequency identification ("RFID") chip embedded within the housing that encodes a first scan destination;
a machine-readable label ("MRL") printed on the housing that encodes a second scan destination; and
wherein:
a scanning device is redirected to a target landing page:
in response to capture of the first scan destination encoded in the RFID chip and a first scan event detail;
in response to capture of the second scan destination encoded in the MRL and a second scan event detail;
the first scan event detail is dynamically determined in connection with the capture of the first scan destination; and
the second scan event detail is dynamically determined in connection with the capture of the second scan destination;
wherein the target landing page is a first target landing page, and the scanning device is redirected to a second target landing page in response to capture of the second scan destination encoded in the MRL within a threshold time of capture of the first scan destination encoded in the RFID chip.

2. The electronic tag of claim 1, wherein:
capture of the first scan destination encoded in the RFID chip causes the scanning device to dynamically determine the first scan event detail; and
capture of the second scan destination encoded in the MRL causes the scanning device to dynamically determine the second scan event detail.

3. The electronic tag of claim 1, wherein:
the MRL is printed on a first side of the electronic tag; and
a second side of the electronic tag comprises an adhesive for mounting the electronic tag to a substrate.

4. The electronic tag of claim 1, wherein capture of the first scan destination encoded in the RFID chip comprises conducting near-field-communication to capture the first scan destination encoded in the RFID chip.

5. The electronic tag of claim 1, wherein the target landing page is a first target landing page, and the scanning device is redirected to a second target landing page in response to capture of the second scan destination encoded in the MRL before capture of the first scan destination encoded in the RFID chip.

6. The electronic tag of claim 5, wherein the scanning device is a first scanning device, a second scanning device is redirected to the second target landing page in response to capture of the first scan destination encoded in the RFID chip when the second scanning device is associated with a target scanning device type.

7. The electronic tag of claim 1, wherein capture of the first scan destination encoded in the RFID chip autonomously triggers activation of hardware on the scanning device for capture of the second scan destination encoded in the MRL.

8. The electronic tag of claim 1, wherein capture of the second scan destination encoded in the MRL autonomously triggers activation of hardware on the scanning device for capture of the first scan destination encoded in the RFID chip.

9. The electronic tag of claim 1, wherein the scanning device provides power to the RFID chip to capture the first scan destination encoded in the RFID chip.

10. The electronic tag of claim 1 further comprising a battery that powers the RFID chip.

11. The electronic tag of claim 10, wherein the scanning device communicates with the RFID chip using a Bluetooth low energy communication protocol.

12. The electronic tag of claim 1, wherein the scanning device uses a camera for capture of the second scan destination encoded in the MRL.

13. An artificial intelligence ("AI") method for dynamically redirecting a scanning device to a target scan destination, the AI method comprising:
  monitoring for capture of a first scan of a machine-readable label ("MRL") printed on an exterior surface of a housing of an electronic tag;
  monitoring for capture of a second scan of a radio-frequency identification ("RFID") chip embedded within the housing;
  formulating a target landing page:
    in response to detecting the capture of the first scan relative to the capture or non-capture of the second scan; and
    based on a scan event detail dynamically determined in connection with the capture of the first scan;
  redirecting the scanning device to the target landing page;
    detecting capture of the second scan within a threshold time after detecting capture of the first scan; and
    formulating the target landing page based on capture of the first scan and the second scan within the threshold time.

14. The AI method of claim 13, further comprising detecting capture of the second scan before detecting capture of the first scan and formulating the target landing page based on capturing the second scan before the first scan.

15. The AI method of claim 13 further comprising formulating the target landing page based on first data encoded in the MRL and second data encoded in the RFID chip.

16. The AI method of claim 13, wherein in response to detecting the non-capture of the second scan within a threshold time after detecting capture of the first scan, formulating the target landing page based on the non-capture.

* * * * *